(12) United States Patent
Vincente et al.

(10) Patent No.: US 6,564,699 B1
(45) Date of Patent: May 20, 2003

(54) PROOFER AND PROCESS FOR PRODUCING EXTENDED SHELF LIFE YEAST-RAISED BAKED GOODS AND EXTENDED SHELF LIFE YEAST-RAISED BAKED GOODS

(75) Inventors: Patricia A. Vincente, Lincoln, RI (US); Michael D. Cataldo, Halifax, MA (US); Richard Golden, Holbrook, MA (US); Melanie A. Reynolds, Franklin, MA (US); Wayne K. Spillner, Westerville, OH (US); Robert P. Pitts, Quincy, MA (US)

(73) Assignee: Dunkin' Donuts, Randolph, MA (US)

( * ) Notice: Subject to any disclaimer, the term of this patent is extended or adjusted under 35 U.S.C. 154(b) by 0 days.

(21) Appl. No.: 09/868,115

(22) PCT Filed: Dec. 16, 1999

(86) PCT No.: PCT/US99/29809

§ 371 (c)(1),
(2), (4) Date: Jun. 14, 2001

(87) PCT Pub. No.: WO00/35290

PCT Pub. Date: Jun. 22, 2000

Related U.S. Application Data

(60) Provisional application No. 60/112,349, filed on Dec. 16, 1998, and provisional application No. 60/112,350, filed on Dec. 16, 1998.

(51) Int. Cl.[7] ............... A47J 39/00; A47J 39/02; A47B 31/02; F25B 29/00; A21C 13/00
(52) U.S. Cl. ............... 99/468; 99/448; 99/476; 99/483; 165/267; 165/919; 219/386; 219/401; 312/236
(58) Field of Search ............... 99/325–333, 342, 99/352–355, 447–450, 467–476, 483, 516, 534; 34/196–200; 62/520, 419, 457.1; 126/20, 201, 369, 20.2; 165/61, 64, 265, 267, 918, 919; 219/386, 387, 478, 480, 506, 521, 401; 312/236; 426/233, 231, 506, 418, 523

(56) References Cited

U.S. PATENT DOCUMENTS

| | | | |
|---|---|---|---|
| 3,552,300 A | | 1/1971 | Matzke et al. ............ 99/352 |
| 3,566,807 A | | 3/1971 | Blanchard et al. ......... 107/54 |
| 3,630,755 A | * | 12/1971 | Schiffmann ............ 99/468 X |
| 3,754,464 A | | 8/1973 | Kaufman, Jr. et al. ...... 99/334 |
| 4,483,243 A | * | 11/1984 | Cote ............... 99/476 X |
| 4,587,946 A | * | 5/1986 | Doyon et al. ......... 219/401 X |
| 4,635,540 A | * | 1/1987 | Dowds ............... 99/468 |
| 4,648,382 A | * | 3/1987 | Greenbacker ......... 165/919 |
| 4,657,769 A | | 4/1987 | Petrofsky et al. ......... 426/549 |
| 4,674,402 A | * | 6/1987 | Raufeisen ............ 312/236 X |
| 4,743,452 A | | 5/1988 | Felske et al. ............ 426/19 |
| 4,891,498 A | | 1/1990 | Fortmann et al. ......... 219/401 |
| 4,939,987 A | | 7/1990 | Smith ............... 99/468 |
| 4,961,941 A | | 10/1990 | Cocco et al. ............ 426/94 |
| 4,984,557 A | | 1/1991 | König ............... 126/21 A |
| 5,083,505 A | | 1/1992 | Kohlstrung et al. ......... 99/331 |
| 5,086,693 A | * | 2/1992 | Tippmann et al. ....... 99/468 X |
| 5,178,125 A | | 1/1993 | Kuen ............... 126/20.2 |
| 5,201,364 A | * | 4/1993 | Tippmann et al. ....... 99/448 X |
| 5,203,258 A | * | 4/1993 | Tippmann et al. ....... 34/200 X |
| 5,223,292 A | | 6/1993 | Thulin et al. ............ 426/283 |
| 5,228,385 A | * | 7/1993 | Friedrich et al. ......... 99/352 |
| 5,273,360 A | * | 12/1993 | Wyatt et al. ......... 219/386 X |
| 5,404,935 A | * | 4/1995 | Liebermann ......... 99/470 X |
| 5,463,940 A | | 11/1995 | Cataldo ............ 99/476 |
| 5,520,102 A | * | 5/1996 | Monetti ............ 99/467 X |

\* cited by examiner

*Primary Examiner*—Timothy F. Simone
(74) *Attorney, Agent, or Firm*—Mintz, Levin, Cohn, Ferris, Glovsky & Popeo, PC

(57) ABSTRACT

A proofer (10) is disclosed for making yeast-raised baked goods having an extended shelf life. The proofer includes a proofing chamber (12) in which heat, humidity, and airflow are more uniform. A process is provided for proofing the raw dough to provide an extended shelf life yeast-raised product Additionally, an extended shelf life product is provided.

41 Claims, 10 Drawing Sheets

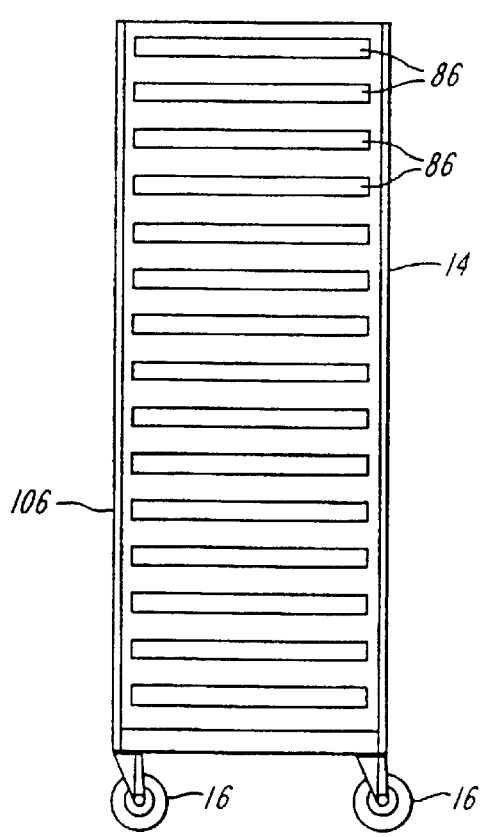
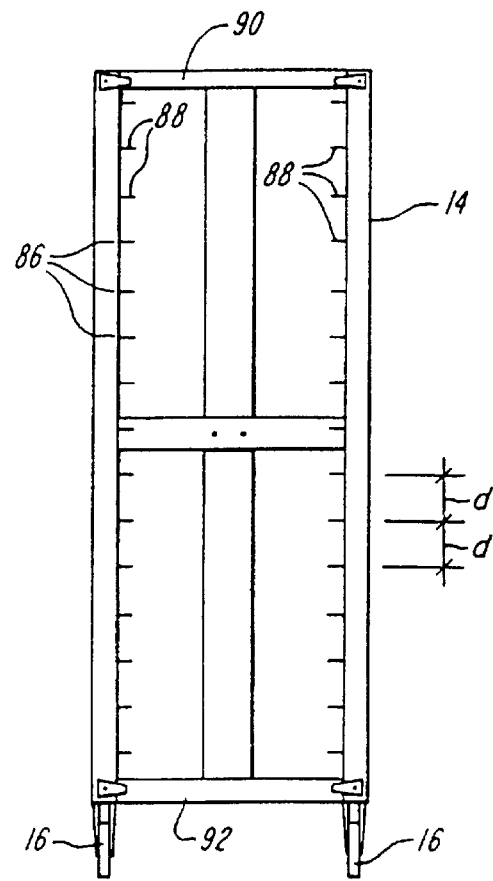
*FIG. 5*  *FIG. 6*

FIG. 13

PROOFER AND PROCESS FOR PRODUCING EXTENDED SHELF LIFE YEAST-RAISED BAKED GOODS AND EXTENDED SHELF LIFE YEAST-RAISED BAKED GOODS

CROSS REFERENCE TO RELATED APPLICATIONS

This application claims the benefit under 35 U.S.C. §119 (e) of U.S. Provisional Application No. 60/112,349, filed on Dec. 16, 1998, and of U.S. Provisional Application No. 60/112,350, filed on Dec. 16, 1998, the disclosures of both of which, are incorporated by reference herein.

STATEMENT REGARDING FEDERALLY SPONSORED RESEARCH OR DEVELOPMENT

N/A

BACKGROUND OF THE INVENTION

Yeast-raised doughnuts and other yeast-raised or yeast-leavened baked goods, such as Danish pastries and croissants, are prized for their soft texture and their fresh yeasty flavor characteristics. Doughnuts are particularly recognized for their airy texture and distinctive fresh yeasty aroma and flavor. The primary components for commercial yeast raised doughnuts are flours, sugars, proteins, flavors, enzymes, emulsifiers, hydrocolloids, chemical leavenings, and fats and oils.

The current shelf life for the optimum quality of commercial yeast-raised doughnuts is about eight to ten hours. These doughnuts lose their eating quality "freshness" as they age and become stale. Staling is any change, other than microbiological spoiling, that occurs in doughnuts during storage and that makes them less acceptable to consumers. Staling occurs when the starch molecules crystallize or "retrograde." Starch retrogradation occurs when the molecules of gelatinized starch reassociate in an ordered structure. In the initial phase, two or more starch molecular chains!form a simple juncture point that then may develop into more extensively ordered regions. Ultimately, this crystalline ordering causes the doughnuts to become stale.

The changes due to staling are sensory (flavor) and/or physical (loss of crumb softness). Regarding the flavor changes, stale doughnuts have an oxidized off flavor and/or lose the fresh yeasty flavor that is characteristic of fresh, yeast-raised doughnuts. Many consumers who are served "stale" doughnuts are dissatisfied. Thus, any improvement that could extend the shelf life of doughnuts or other baked goods and/or retard or delay staling would be beneficial.

SUMMARY OF THE INVENTION

The present invention relates to a commercial proofing oven or proofer for proofing the raw dough of yeast-raised baked goods that is able to extend the shelf life of yeast-raised baked goods, and particularly doughnuts, to twenty-four hours.

In particular, the proofer of the present invention includes an insulated housing and a proofing chamber within the housing to receive a rack for holding a raw dough product to be proofed. A dehumidifier, a heating unit, a humidifier, and an air circulator are provided within the housing, under control of a controller, to provide an airflow conditioned for proofing the raw dough product. These components are selected to return to their desired set points after preheating generally within ten to fifteen minutes after opening the door to ambient. The proofer includes at least one sensor comprising a relative humidity sensor or a temperature sensor located within the proofing chamber close to the raw dough product to provide an accurate reading of conditions at the product. Preferably, the proofer includes at least two relative humidity sensors, one mounted on a rear inside surface of the proofing chamber and one mounted on the inside surface of the door. Preferably, the proofer also includes a temperature sensor mounted on the inside surface of the door.

In a further aspect of the invention, the proofer includes a rear partition in the proofing chamber that includes two side panels each having a plurality of openings and vertical louvers disposed to provide a more uniform airflow in the proofing chamber. A rack positioning device is located within the proofing chamber to contact the rack and fix the rack in a desired position within the proofing chamber upon closure of the sealable door. A baker's rack for holding raw dough to be proofed within a proofing chamber has an increased spacing between tiers to provide a less restricted airflow. Top and bottom covers may be used to cover the baker's rack, to further control the airflow.

In this manner, the proofer of the present invention is able to maintain the temperature and relative humidity consistently within the desired ranges in the proofing chamber. The proofer is also able to return to the desired temperature and relative humidity quickly, generally within ten to fifteen minutes after opening the door. The air flow patterns in the proofing chamber give a spatially uniform temperature and relative humidity, resulting in more consistent product quality from position to position in the proofing chamber.

The present invention relates to a process for making dough of yeast-raised baked goods that extends the shelf life of yeast-raised baked goods, and particularly doughnuts, to twenty-four hours. The process comprises providing a yeast-raised dough at 85° F. After mixing the dough, the dough is set to rest in the mixing bowl for 45 minutes. After resting, the dough is sheeted, shrunk, and formed into desired shapes. The dough is then proofed for a time appropriate for the type of desired baked good and dough cut. After proofing, the dough is baked to produce the final baked good. In the case of doughnuts, the doughnuts are fried in a suitable oil.

The present invention also provides a formulation for baking a yeast-raised baked good having an extended shelf life. The ingredients that contribute to the shelf life extension of the product are the hard wheat flour, soft wheat flour, dextrose, soybean oil, nonfat dry milk or milk replacement, the fermented flavor, gums, vital wheat gluten, distilled monoglycerides, enzymes, konjac flour, and methylcellulose.

DESCRIPTION OF THE DRAWINGS

The invention will be more fully understood from the following detailed description taken in conjunction with the accompanying drawings in which:

FIG. 5 is a side view of a baker's rack for use with the proofer of FIG. 1;

FIG. 6 is a front view of the baker's rack of FIG. 5;

FIG. 13 is a partial view of an alternative embodiment of an airflow panel according to the invention.

DETAILED DESCRIPTION OF THE INVENTION

Figure 1:
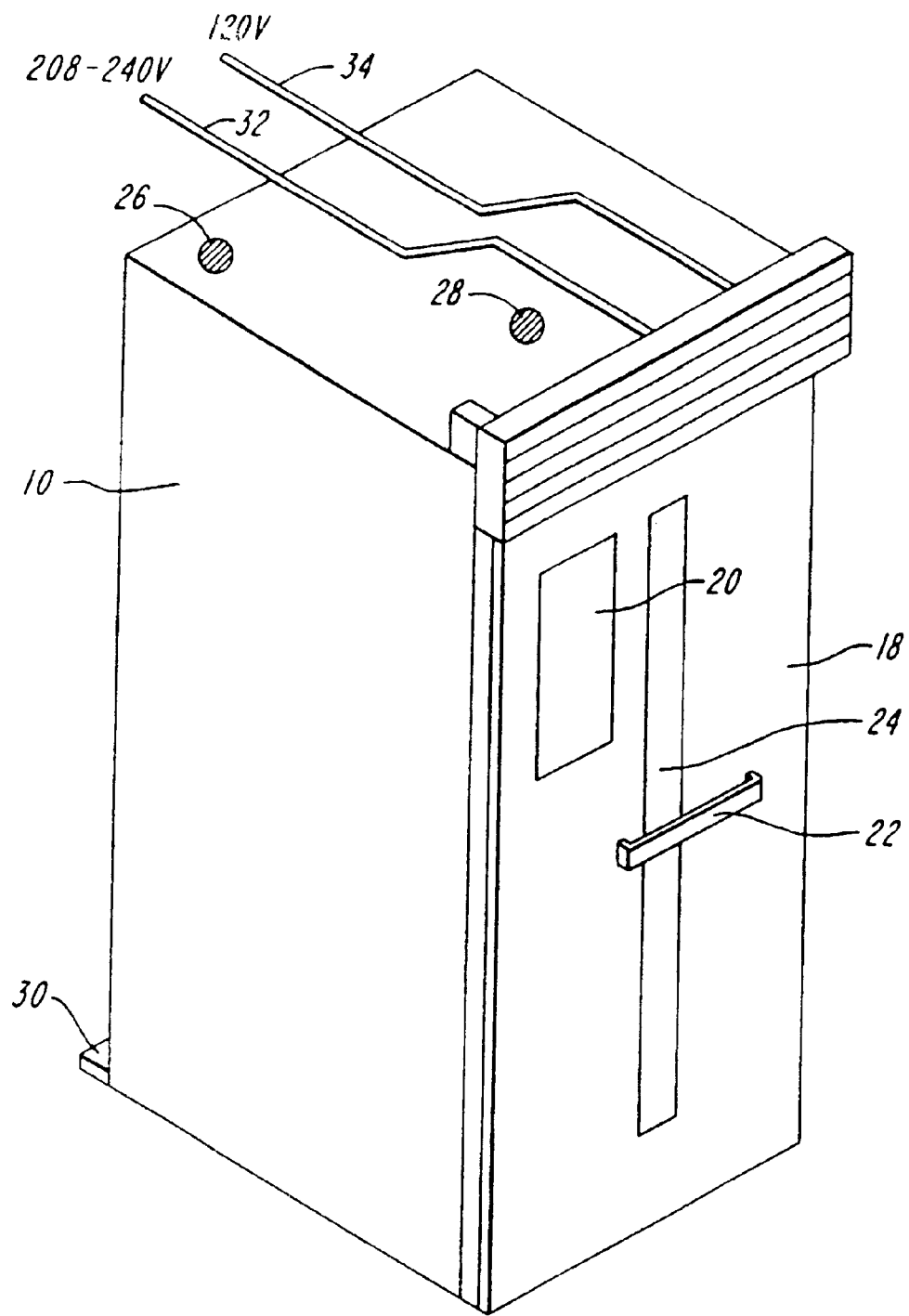
FIG. 1 is an isometric view of a proofer according to the present invention.
Figure 3:
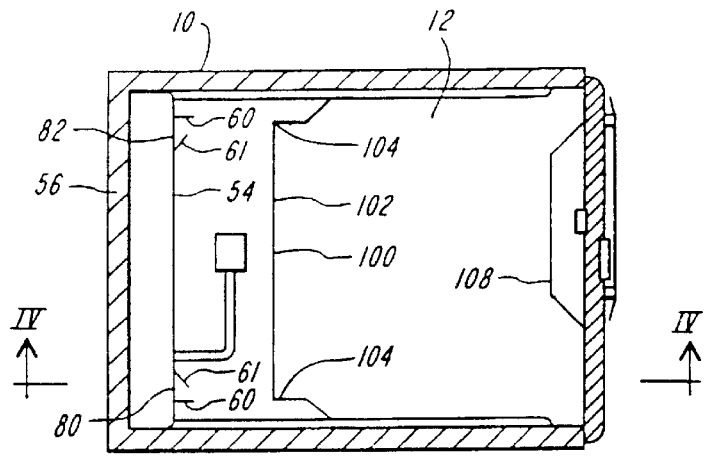
FIG. 3 is a cross-sectional view along line III—III of FIG. 2.
Figure 2:
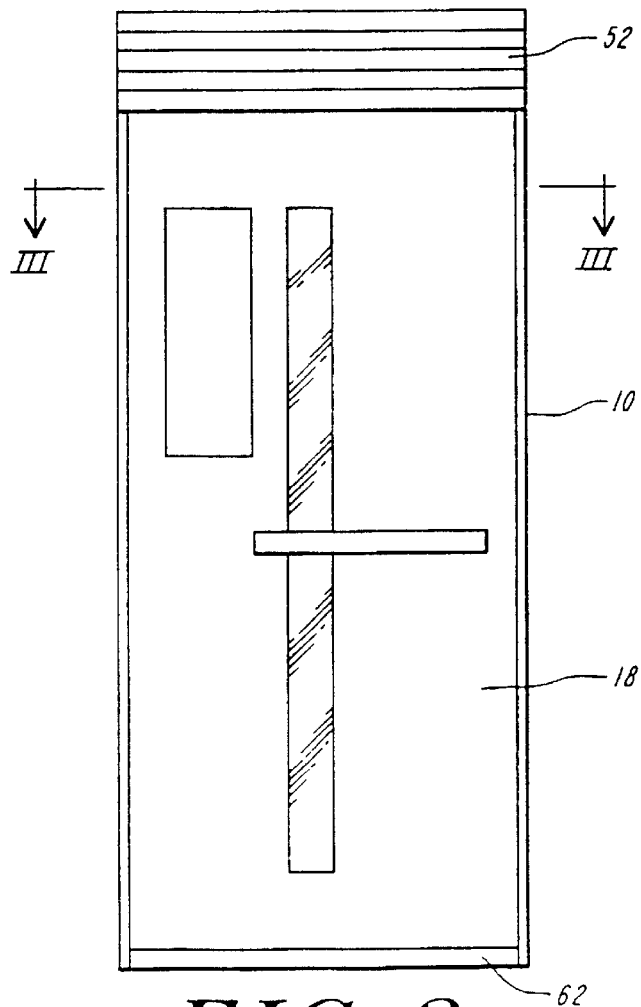
FIG. 2 is a front view of the proofer of FIG. 1.

A proofing oven or proofer for yeast-raised baked goods according to, the present invention is illustrated in FIGS. 1–4. The proofer includes a thermally insulated housing 10 containing a proofing chamber 12. A baker's rack 14 for holding the product to be proofed, shown in FIGS. 5 and 6, is movably housed within the proofing chamber. The baker's rack is mounted on wheels 16 to allow it to be loaded outside of the proofer and then wheeled into the proofer. A door 18 seals the proofing chamber 12 from the ambient environment during proofing. A control panel 20 for use by a baker is located on the door. The door 18 includes a handle 22 and a window 24 to allow the baker to see the product in the proofing chamber. A power input 26 and a water input 28 4re provided on the top, although they could be in other locations if desired. A drainage opening 30 for removing condensed water from the proofing chamber is located on the bottom at the back. A 208 V line 32, a 240 V line 34, or both are provided for a heating unit, discussed further below.

Figure 4:
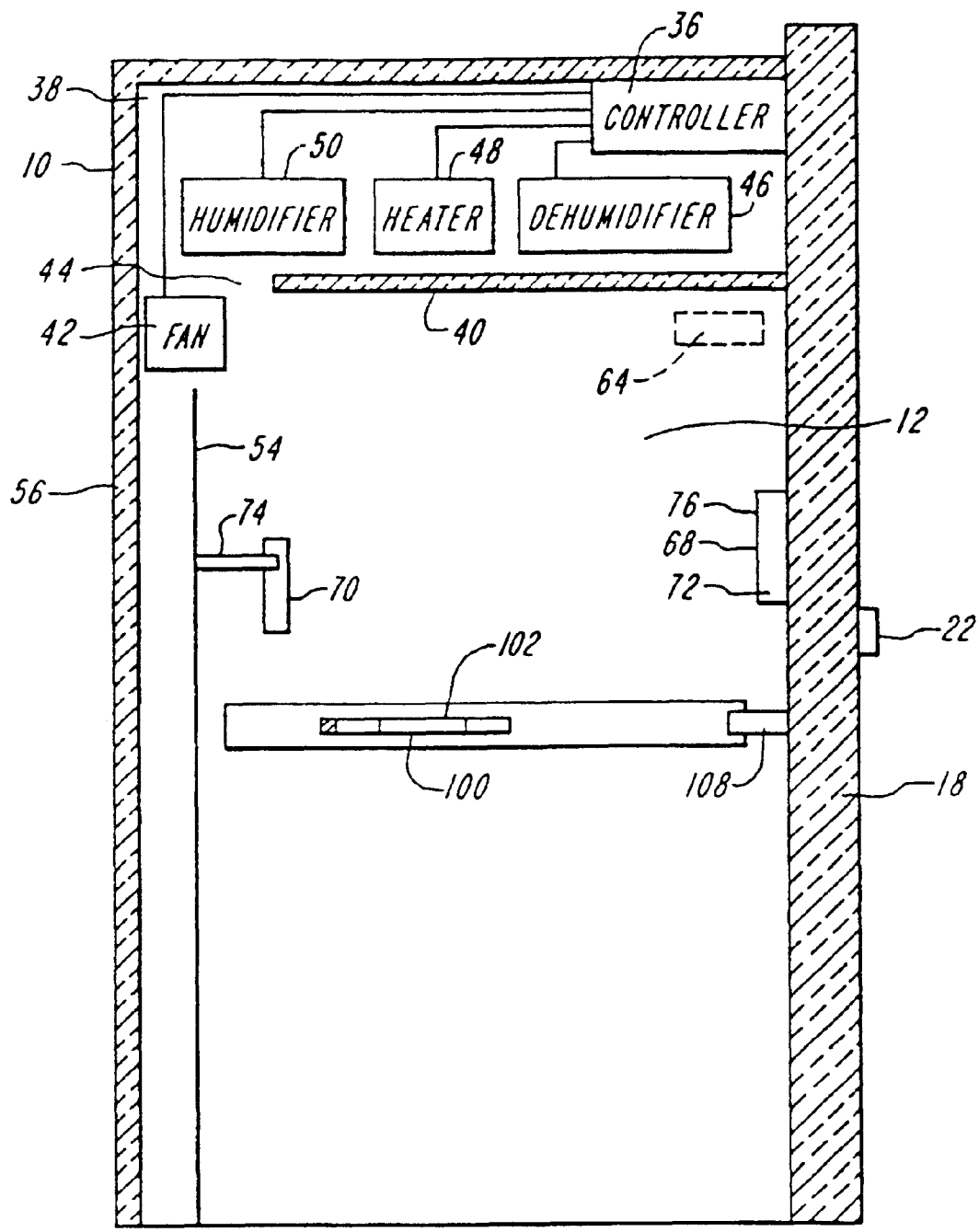
FIG. 4 is a cross-sectional view along line IV—IV of FIG. 3.

Inside the proofer, indicated in FIG. 4, a controller 36 is provided for communication with the control panel 20 and other components for conditioning the air in the proofing chamber 12, discussed further below. The controller is preferably located in an upper region 38 of the proofer housing 10, above the proofing chamber 12. The upper region 38 may be separated from the proofing chamber 12 by a wall 40 or other partition. A fan or air blower 42 is provided to circulate air throughout the proofing chamber 12. An opening 44 in the partition 40 is provided to allow air to enter the proofing chamber.

The other components for conditioning the air include a dehumidifier 46, a heating unit 48, and a humidifier 50. The heating unit 48 is provided to heat the air to the desired temperature. The humidifier 46 is provided to increase the moisture content of the air, and the dehumidifier 50 is provided to decrease the moisture content. The controller 36 is in communication with the air blower 42, the dehumidifier 46, the heater 48, and the humidifier 50 to control their operation to provide the desired conditions within the proofing chamber 12. Conditioning the air in accordance with the present invention means adjusting the heating unit, humidifier, dehumidifier, and air circulator to achieve the desired values of temperature, humidity, and airflow.

Figure 7:
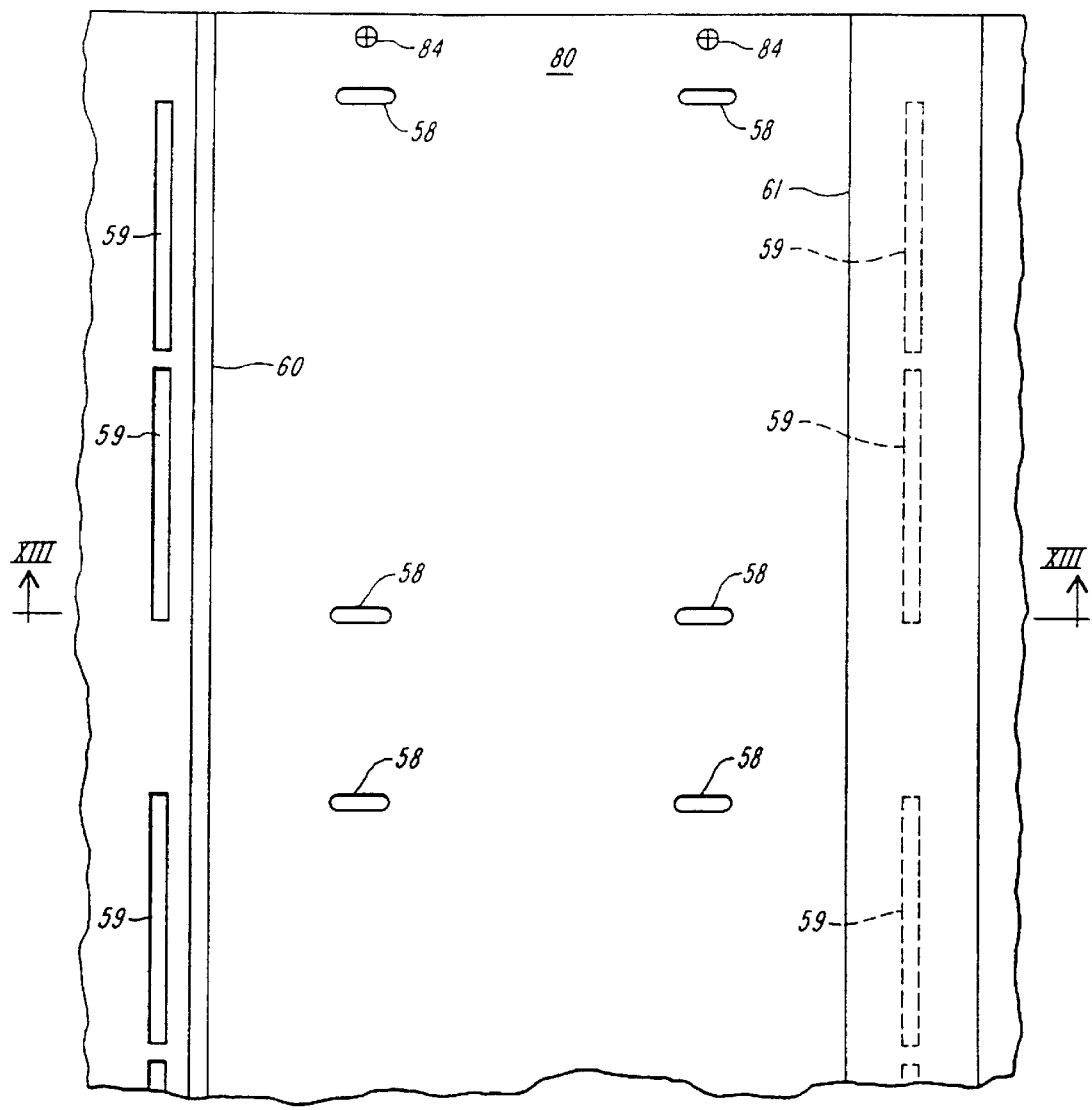
FIG. 7 is a partial view of a rear partition of the proofer of FIG. 1.
Figure 8:
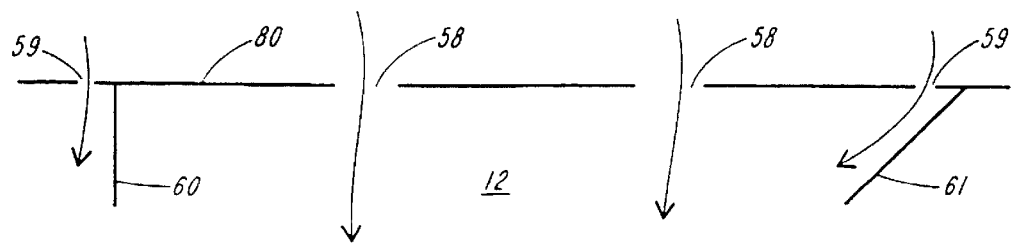
FIG. 8 is a cross-sectional view taken along line XIII—XIII of FIG. 7.

Air, drawn by the air circulator 42, enters through air intake vents 52, typically at the top of the proofer. The air intake vents may also be adjustable, either manually or under the control of the controller 36. Air flows past the dehumidifier 46, heating unit 48, and humidifier 50 and into a chamber behind a partition 54 extending parallel to and spaced from the back wall 56 of the proofer. The partition includes airflow openings 58, 59 into the proofing chamber 12 and also preferably louvers 60, 61 to provide a more uniform distribution of airflow over the product, discussed more fully below in connection with FIGS. 7 and 8. The air exits the proofing chamber, typically at gaps at the sides of a gasket 62 along the bottom of the door. Other exit vents could be provided if desired. In an alternative embodiment, all or a portion of the air may be recirculated within the proofer. An additional fan and/or return duct 64 may be provided for this purpose, suitably located, for example, at the top front of the proofing chamber, to pull the airflow up through a further opening in the partition 40 toward the dehumidifier, heating unit, and humidifier.

Temperature and relative humidity sensors 68, 70, and 72 are located inside the proofing chamber in communication with the controller 36. The sensors are mounted to be close to, and preferably within several inches of, the product on the rack 14. Preferably, at least one temperature sensor 68, such as a thermocouple, is mounted to the inside face of the door 18. The temperature sensor is vertically placed near the middle of the upper half of the proofing chamber. Preferably, at least two relative humidity sensors 70, 72, such as hygrometers, are provided. A first relative humidity sensor 70 is located at the rear of the proofing chamber, approximately at or slightly above the vertical midpoint. This relative humidity sensor is mounted on an arm 74 to displace it from the partition 54, so that the sensor is located in the air stream directed toward the product on the baker's rack. A second relative humidity sensor 72 is mounted on the inside face of the door 18. This sensor is located to sense the humidity in the air stream that has flowed over the product. In this way, this sensor is able to sense any changes in relative humidity due to the air flow over the product, because air flowing over the product can pick up moisture from the product, drying the product out. In both of these locations, the sensors are near the product. The temperature sensor is preferably protected by a stainless steel sheath 76. The second relative humidity sensor and the temperature sensor can be located in a single sensing unit housing, if desired.

In prior art proofers, the relative humidity and temperature sensors are typically placed in either the area after conditioning of the air, in the upper region of the proofer, or in some other part of the box where conditions differ from conditions closer to the product. Thus, the controller responds to conditions other than the conditions affecting the product. Typically, the reading from the prior art sensors indicates a warmer, dryer environment, and therefore less heating and dehumidifying are provided than are actually needed. With the present invention, the sensors are located closer to the product, and typically detect a cooler, moister environment. Thus, consistent heating, humidifying, and dehumidifying are generally provided in the present proofer, and the final baked product has a greater shelf life as a result.

The temperature sensor and the relative humidity sensors must have a sufficient accuracy and a sufficient response time to changes in conditions in the proofing chamber, so that they can provide the controller with a timely and accurate reading. In this manner, the controller is able to make any necessary changes to the heating unit, the humidifier, the dehumidifier, or the air blower. Preferably, the temperature sensor has an accuracy of ±1° F. The sensor must be rugged and able to withstand airborne contaminants and very high humidity. It must be able to sense temperatures of at least 160° F. The relative humidity sensors preferably have a 15 second response time for a 90% change in relative humidity. The accuracy should be at least ±2%, and preferably ±1%. As with the temperature sensor, the relative humidity sensor must be rugged and able to withstand airborne contaminants and very high humidity. It must be capable of operating at temperatures between 0° F. and 175° F.

In the preferred embodiment, multiple sensors are provided to accommodate the different airflow patterns that result in a variation in conditions within the rack. Two relative humidity sensors are generally adequate, one sensor 70 positioned just before the air enters the rack 14, and a second sensor 72 positioned just after the air exits the rack 14. The controller 36 calculates a single value of the relative humidity in any suitable manner, such as by taking the average of the two signals. The use of multiple sensors is also useful for reliability purposes; when the sensor readings disagree with each other by more than a specified amount, the controller signals an alarm indicating that one or more of the sensors is out of calibration, is malfunctioning, or otherwise needs service or replacement.

The heating unit 48 is preferably able to achieve the desired set point temperature within ten to fifteen minutes. A resistance heater in which air is heated as it flows over a heated current-carrying element is suitable. The size, number, and voltage of the heaters may be selected to achieve this desired degree of heating, as would be known by one of skill in the art. For example, a 208/240 V resistance heater, single or three phase, with a maximum wattage of 8500 W is suitable. Other types of heaters may be used, as would be known by one of skill in the art.

The humidifier 50 and dehumidifier 46 may be of any suitable type. The humidifier may, for example, incorporate a steam injection system or a flash heater system. The dehumidifier may be, for example, a condenser system, a desiccation system, or an intake of outside air to dilute the air in the chamber. A combination of dehumidification schemes may be used. As with the heating unit, the humidifier and dehumidifier are preferably able to reach the desired set point relative humidity within ten to fifteen minutes.

The controller 36 is in communication with the air circulator 42, the dehumidifier 46, the heating unit 48, and the humidifier 50. Any suitable control scheme or algorithm may be used, such as ON/OFF, PID, or anticipatory (feedforward or similar) control. The "deadbands" of the control algorithm are adjusted to achieve the desired tolerances on temperature and relative humidity required for an extended quality baked good. The deadband is the amount above or below the set point to which a variable may drift before triggering a response from the controller, such as turning on the compressor for dehumidification. If the deadbands are too large, the proofer may drift away from the desired conditions before the system can bring it back into control. If the deadbands are too small, the proofer may attempt to control too much, causing short cycling which may lead to inefficient operation and reliability and maintenance problems.

The proofer of the present invention is able to achieve a more uniform distribution of airflow. An imbalance or incorrect distribution of airflow, meaning too much air enters at some locations and too little at other locations, can result in so much heat transfer to the walls in one part of the air path that the air downstream is too cool. Misdirection of the airflow can result in too little mixing of the air streams and/or too high an air velocity impinging on certain positions of the rack. Air velocities that are too harsh or too gentle on the product can result in excessive drying or stagnant, moisture-laden regions.

Airflow adjustments may be made in several ways. If the proofer needs outside air to provide additional cooling, the outside air is brought into the proofer and mixed well with recirculating internal air and may be conditioned before being introduced into the proofing chamber where the product rack is located. In this way, no ambient or outside air contacts the product prior to conditioning.

Airflow volumes are balanced from top to bottom, front to back, and side to side within the proofing chamber, so that the temperature distribution inside the proofing chamber is even. Total air velocity is adjustable via the fan speed and/or the air inlet area. The air velocity should be sufficiently high to ensure adequate mixing in the box, but not so high as to reduce mixing (by channeling of air streamlines past each other) or to reduce product quality through excessive drying or impingement problems. For a proofer that recirculates air, the air velocities range from 26 to 62 feet per minute. For a proofer that does not recirculate air, the air velocities range from 85 to 114 feet per minute.

Also, as noted above, the partition 54 at the rear of the proofing chamber includes openings 58, 59 and preferably louvers 60, 61 to provide a more uniform distribution of airflow over the product on the baker's rack. In a preferred embodiment that has been found to provide a suitable uniform airflow, the partition has a left side panel 80 and a right side panel 82. A portion of the left side panel 80 is illustrated more particularly in FIGS. 7 and 8. Each panel includes openings or perforations 58, 59 through which air from behind the partition flows. The openings 58 are preferably generally elongated or oval-shaped and is approximately ½ inch long and ¼ inch high. In each side panel section, the openings 58 are provided in two columns spaced approximately 3 inches apart. An alternating vertical spacing of approximately 8.5 inches and 1.5 inches between openings has been found to be satisfactory. These spacings may be adjusted at the bottom of the panel to accommodate the vertical dimension of the baker's rack if necessary.

Preferably, each side panel also includes louvers 60, 61 that extend inwardly approximately 1.5 inches toward the front of the proofing chamber. The louvers also extend vertically the length or substantially the length of the proofing chamber. Vertically oriented slots 59 are provided adjacent each louver 60. The slots are about 4.5 inches in length. An alternating vertical spacing between slots of approximately 1/16 inch and 1.5 inches has been found to be satisfactory. These spacings may be adjusted at the bottom of the panel to, accommodate the vertical dimension of the baker's rack if necessary.

On each side panel, the louver 60 closest to the side of the proofer preferably extends 90° to the panel. The louver 61 that is closer to the middle of the proofer extends at a 45° angle. The openings, 58, slots 59, and louvers 60, 61 having this orientation and configuration have been found to provide a uniform airflow from top to bottom, back to front, and side to side within the proofing chamber.

The partition 54 and the side panels 80, 82 may be formed in any suitable manner. Preferably, they are made of stainless steel, although any other suitable material may be used. The louvers 60, 61 may be formed by providing individual metal sheets with long vertical edges bent to the appropriate angle. The individual sheets may then be fastened to other appropriate partition panel sections in any suitable manner, such as by screws 84, rivets, or other means known to those of skill in the art. The openings 58 and slots 59 may be formed in any suitable manner, such as by punching or, drilling. Alternatively, the louvers 60, 61 may be formed as separate strips attached, for example, by welding to the partition 54.

Figure 12:
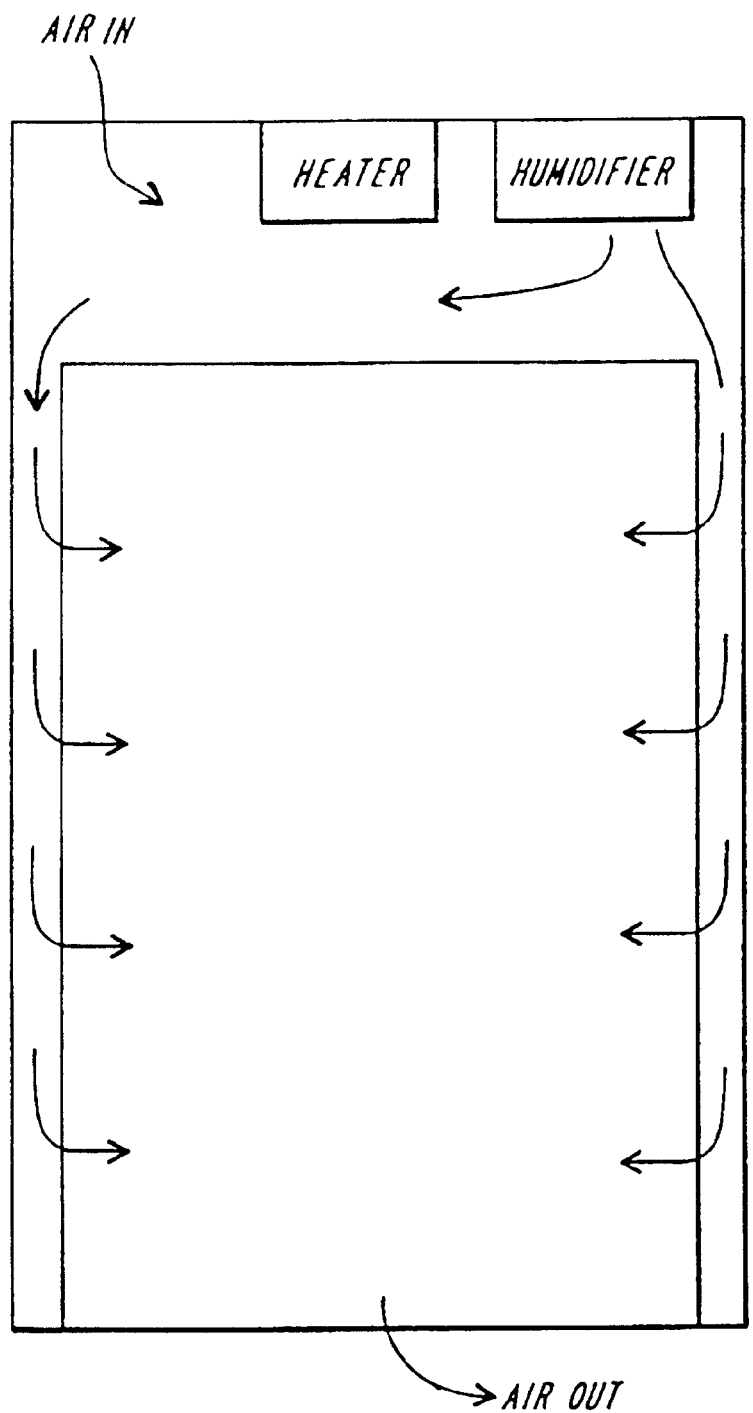
FIG. 12 is a front cross-sectional view of a further embodiment of a proofer according to the invention.

In a further embodiment, a panel is placed on one and preferably both sides of the proofing chamber spaced from the side walls to form an airflow chamber between the side panels and the proofer side walls. Perforations are formed in evenly spaced rows across substantially the entire area of the panel. Air flows through the perforations from the sides toward the product as indicated generally in FIG. 12.

Figure 13:
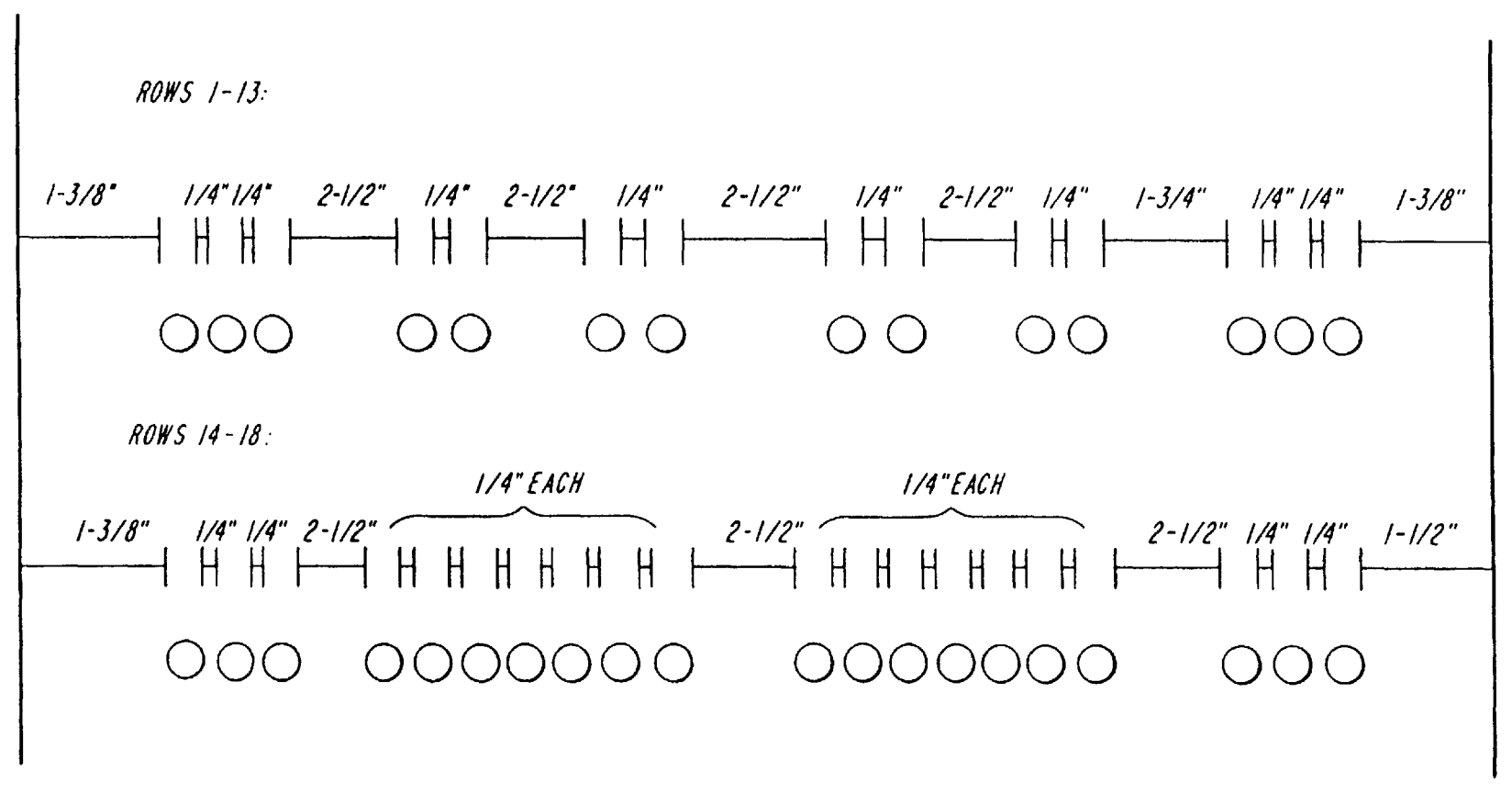

In one preferred embodiment, each side panel has 18 rows of perforations comprising circular openings having 0.5 inch diameter extending from six inches below the top of the proofing chamber to six inches above the floor of the proofing chamber. Each row is vertically spaced from adjacent rows by 2.75 inches. The top thirteen rows have the same horizontal spacing between perforations, as indicated in FIG. 13. The bottom five rows have same horizontal spacing between perforations, as also indicated in FIG. 13. In this embodiment, air enters at the top of the proofer, flows down the sides, enters the proofing chamber from the sides, and flows out along the bottom of the door. This configuration is suitable for a proofer having dimensions of 78⅝ inch in height, 33½ inch in width, and 33¼ inch in depth and a proofing chamber having dimensions of 67½ inch in height, 33 inch in width, and 33¼ inch in depth.

In a further aspect of the present invention, a rack holder or rack positioning device 100 is provided within in the proofing chamber 12 to fix the position of the rack 14 during proofing. The rack holder includes strips 102, such as of sheet metal or square cross-section bar, affixed on either side to the inside walls of the proofing chamber or to the rear partition to limit travel of the rack rearwardly and sideways. Preferably, the rack holder is formed from metal strips bent to form corners 104 in which corners 106 of the rack 14 fit snugly or somewhat snugly. In an alternative embodiment, strips may be fixed within the proofing chamber against which the corners of the rack are aligned. The strips may have any suitable configuration, such as bars of square cross-section. A strip 108 may also be placed on the inside surface of the door 18. Upon closure of door, the strip 108 pushes the rack 14 into position against the rack holder strips 102.

Referring to FIGS. 5 and 6, the rack 14 is formed with tiers 86 having shoulders or lips 88 on which rest screens (not shown) that hold the raw dough to be proofed. In a further aspect of the present invention, the spacing or separation d between the tiers 86 is selected so that it is not too small. If the separation between the tiers is too small, airflow may be restricted and moisture coming off the product may be too close to the rest of the product. Preferably, the tiers, and thus the screens, are separated by at least 82 mm for raw dough pieces having a raw weight of 1.5 ounces. For proofing chambers of the typical size, racks having a spacing of 82 mm can have 17 tiers. In contrast, typical prior art racks have 20 tiers separated by 69 mm. In another alternative, the top 90 or bottom 92 of the rack 14, may be covered with a metal flow-diverter plate.

The control panel 20 for the proofer of the present invention is optimized for convenience and flexibility and located at a suitable height for easy access by the baker. Preferably, one-button settings are provided for different typical combinations of product, rack loading, and cut. For example, products may include doughnut rings, doughnut shells, doughnut holes, doughnut fancies, or croissants. Rack loadings are typically full or half racks. Cuts are typically the first cut, the second cut from the scraps left after the first cut, and a mixture or third cut of the scraps from the first and second cuts. A timer control button is provided to allow the user to extend the proof time in increments if necessary.

The controller 36 includes an alarm to provide an audible and/or visible signal when the proof time is complete. Preferably, the controller also includes an alarm to provide an audible and/or visible signal to indicate a time several minutes from the end of the proof time. This gives the baker warning that the product will shortly need to be checked and removed from the proofer. The window 24 in the door of the proofer preferably extends vertically to allow the baker to see every screen on the rack.

A proofer according to the present invention described above has been tested. In this proofer, overall airflows were balanced as discussed above. The set points were 63% relative humidity and 105° F. The relative humidity controller deadband was ±3%. The desired relative humidity and temperature were reached within 15 minutes and remained within the desired range throughout the proofing cycle. No mid-proofing adjustments were needed by the baker and the quality of the proofed doughnuts was sufficient to provide an extended shelf life doughnut. Doughnuts proofed with the proofer have been found to have a shelf life of at least twenty-four hours.

The proofer of the present invention is suitable for proofing any type of yeast-raised or yeast-leavened baked goods. Such yeast-raised baked goods include, but are not limited to, doughnut rings, doughnut shells, doughnut holes, croissants, Danish pastries, and fancies such as bowties, cinnamon rolls, turnovers, tarts, or eclairs. All or any of the various aspects of the present invention discussed above may be provided in newly manufactured proofers, or existing or known manufactured ("out-of-the-box") proofers may be retrofitted with any one or more of the various aspects of the present invention.

The present invention relates to a process for making yeast-raised baked goods, particularly doughnuts, having an extended shelf life of up to at least 24 hours. The dough for yeast-raised baked goods typically comprises a number of dry ingredients to which one or more liquids are added. The dough is then mixed, typically about twelve minutes.

In contrast to prior art process, in which the dough after mixing generally has a temperature of 75 to 80° F., in the present invention, the dough after mixing must have a temperature of 85° F.±3° F. This temperature may be achieved by bringing the liquid ingredients to the appropriate temperature prior to mixing the liquids with the dry ingredients. The appropriate liquid temperature may be determined by the following formula:

$$T_{liquid} = T_{control} - (T_{room} + T_{mix} + T_{ff})$$

where:

$T_{liquid}$ is the desired temperature of the liquid ingredients prior to mixing with the dry ingredients;

$T_{control}$ is a predetermined temperature control factor; $T_{control}$ has been determined to be 255° F.;

$T_{room}$ is the room or ambient temperature;

$T_{mix}$ is the temperature of the dry ingredients prior to the addition of any liquids; and $T_{ff}$ is a friction factor based on the particular mixer to be used; for example, for a Hobart 80 quart mixer, the friction factor $T_{ff}$ is 45° F. The friction factor for other mixers can be readily determined by preparing a batch of dough using the above formula and measuring the temperature of the dough after mixing. If the dough temperature is out of the desired range, the difference between the desired temperature and the actual temperature is added to 45° F. to arrive at a revised friction factor. Typically, smaller batches, under 25 lbs., utilize a smaller friction factor, such as $T_{ff}=40°$ F.

As an example using a Hobart 80 quart mixer for which $T_{ff}=45°$ F., if $T_{room}=72.1°$ F., $T_{mix}=69.8°$ F., and $T_{control}=255°$ F., then $T_{liquid}=68.1°$ F.

Typically, water is the principal liquid ingredient added to the dough in commercial baking of yeast-raised baked goods. The water may be dispensed by a known commercial water meter, such as Model SP600-M3 available from The Baxter Mfg. Co., Inc., of Orting, Wash., which is able to dispense a determined amount of water at a determined temperature. The amounts of water and dry ingredients for, commercial baked goods are typically well known for each particular recipe. The ingredients are mixed for an appropriate time, typically about twelve minutes, initially at a lower speed, then, after about two minutes, at a higher speed. After mixing, the dough should have a clear membrane. The dough is covered and set to rest in the mixing bowl for at least 45 minutes. A properly fermented dough passes the crease test after this rest time. After the rest period, the dough is rolled into a sheet and shrunk, as known in the art. The dough is then cut into the appropriate shapes and placed on screens. The screens are loaded onto the baker's rack.

The order of loading the baker's rack also has a perceptible effect on the quality of the final baked good. Because dough that is sheeted and cut starts to proof immediately, the first product pieces to be loaded on the rack are more proofed than the last pieces to be loaded. Also, the velocity field present at various heights on the rack may slightly over or under proof the pieces at that position if a prior art proofer is used. Thus, optimization may be achieved by loading the rack so that the first pieces to be cut are put in positions that get slightly underproofed, and the last pieces to be cut are put in positions that get slightly overproofed. A typical loading sequence that has been found to be suitable is to load from the center tier of the rack out alternately to the top and bottom.

The proofer is turned on and the desired temperature in the proofing chamber is entered through the control panel on the proofer. The proofer should be turned on sufficiently in advance to allow the proofer to reach the desired temperature and relative humidity before the product is ready to be loaded, so that the rack of the product can be placed into the proofer as soon as it is fully loaded. The proofing temperature is 105° F.±5° F., and preferably ±3° F. The relative humidity, RH, inside the proofing chamber is similarly entered through the control panel. The RH is 65%±8%. The proofing time is then entered. Proofing times for some typical yeast-raised baked goods are as follows:

| BAKED GOOD | PROOFING TIME |
|---|---|
| doughnut holes | 40 minutes |
| doughnut rings | 40 minutes |
| doughnut shells | 45 minutes |
| yeast fancies | 60 minutes |
| croissants | 90 minutes |

The proofing temperature, relative humidity, and proofing time may be entered individually by the baker. Alternatively, the controller of the proofer may be programmed with various preset programs for each type of product that may be proofed, such as doughnut holes, rings, or shells, yeast fancies, or croissants, or any other yeast-raised baked goods.

After the baker's rack is loaded into the proofer, the proofer door is closed and secured to ensure that the proofing chamber is sealed from the ambient environment. The door should not be opened during the proofing cycle. The proofing cycle is initiated, typically by pushing a start button on the control panel. When the proofing cycle is complete, the controller turns off the proofer and sounds an alarm to alert the baker to remove the product. The product is then finished by the appropriate method, such as frying or baking, as is known in the art. Doughnuts should be fried immediately upon removal from the proofer. Preferably, doughnuts are fried at 375° F. for 45 seconds on each side.

The process of the present invention is suitable for making any type of yeast-raised or yeast-leavened baked goods. Such yeast-raised baked goods include, but are not limited to, doughnut rings, doughnut shells, doughnut holes, croissants, Danish pastries, and fancies such as bowties, cinnamon rolls, turnovers, tarts, or eclairs.

The present invention provides an optimization of the formulation of the ingredients for yeast-raised baked goods to increase the shelf life of the baked goods. The present optimized formulation is particularly beneficial for increasing the shelf life of doughnuts.

The basic ingredients for doughnuts include flours, sugars, proteins, flavors, enzymes, emulsifiers, hydrocolloids, chemical leavenings, and fats and oils. The critical functional ingredients, for example, emulsifiers, enzymes, and humectants, in the formulation of prior art yeast-raised doughnuts are either at an inappropriate amount or are not of the appropriate class of compounds.

Accordingly, doughnuts according to the present invention include the following dry ingredients (excluding yeast):

| Ingredient(s) | Acceptable Range (wt. %) | Preferred Amount (wt. %) |
|---|---|---|
| Hard wheat flour (bead flour) | 58–62 | 60.5 |
| Soft wheat flour (pastry flour) | 16–18 | 17.33 |
| dextrose (monohydrate) | 6.5–9 | 8.55 |
| Soybean oil, bulk | 6–8 | 6.6 |
| salt | 1–2 | 1.45 |
| color | 0.1 | 0.1 |
| Nonfat dry milk or milk replacement | 0.75–1.25 | 1.0 |
| Sodium acid pyrophosphate | 0.5–0.9 | 0.7 |
| Fermented flavor | 0.04–0.06 | 0.05 |
| soy flour | 0.6–1.4 | 1.2 |
| Natural and artificial vanilla powder | 0.25–0.4 | 0.3 |
| Sodium bicarbonate | 0.4–0.6 | 0.5 |
| I-cysteine | 0.01 | 0.01 |
| Crumb softener blend | 1.56–3.38 | 1.71 |

The Crumb Softener Blend includes the following:

| Ingredient(s) | Range in Total Formula (wt. %) | Preferred Amount in Blend (wt. %) | Preferred Amount in Total Formula (wt. %) |
|---|---|---|---|
| Enzyme blend | 0.6–1.0 | 35.191 | 0.60 |
| Distilled monoglycerides | 0.1–0.4 | 5.865 | 0.10 |
| Vital wheat gluten | 0.5–1.0 | 29.326 | 0.50 |
| Konjac flour | 0.06–0.18 | 4.692 | 0.08 |

-continued

| Ingredient(s) | Range in Total Formula (wt. %) | Preferred Amount in Blend (wt. %) | Preferred Amount in Total Formula (wt. %) |
| --- | --- | --- | --- |
| Gum blend | 0.2–0.4 | 14.663 | 0.250 |
| Methylcellulose | 0.10–0.40 | 10.264 | 0.18 |

The ingredients that contribute to the shelf life extension of the product are the hard wheat flour, soft wheat flour, dextrose, soybean oil, nonfat dry milk or milk replacement, the fermented flavor, the gum blend, vital wheat gluten, distilled monoglycerides, the enzyme blend, konjac flour, and, methylcellulose.

Vital wheat gluten is a wheat protein that acts as a humectant, to retain doughnut moisture, as well as a crumb softener. It is available as Provim ESP® from ADM/Arkady in Olathe, Kans.

The nonfat dry milk is a dairy protein that has a positive effect in delaying staling.

The enzyme blend contains fungal amylase that is a blend of 96.18 weight % novo maltogenic amylase and 3.82 weight % novo xylanase. These enzymes break down starch molecules, preventing starch recrystallization. This helps prevent starch retrogradation and delays staling. The enzyme blend also includes lecithin (8.71 weight %), mono and diglycerides (34.65 weight %), sodium stearoyl lactylate (34.65 weight %), and whey protein concentrate (15.00 weight %), and whey powder (1.40 weight %), in addition to the enzymes (7.59 weight %).

Konjac flour is a blend of the dried root tuber of *Amorphophallus Konjac* and carrageenan. It helps retain moisture of the doughnuts, thus retaining crumb softness and delaying staling. Konjac flour is available as Nutricol® GP 312 Konjac Flour from the Food Ingredients Division of FMC Corporation, of Philadelphia, Pa.

Methylcellulose is a hydrocolloid that is also able to retain moisture of the doughnuts, thereby contributing to crumb softness. The methylcellulose is available as Methocell A4M from Dow Chemical U.S.A. of Midland, Mich.

The above ingredients are also able to tolerate a wider variation in the parameters in the process of making doughnuts, such as bowl time, dough temperature, proof time, proof temperature, or proof humidity.

The flavors in the above formulation include a fermented flavor or encapsulated yeast flavor and a vanillin flavor. The fermented flavor extends the flavoring aromatics of doughnuts at least twenty-four hours. The fermented flavor may comprise a spray dried beer flavor and is available, for example, as Cumberland Packing #868054. The natural and artificial vanilla powder is available as, for example, BR Flavors Bench #082699.

The distilled monoglycerides are available as Dimodan PV 300 K, from Danisco.

The gum blend typically includes cellulose gum, guar gum, carrageenan gum acacia, and xanthan. The particular amounts of the gums are not critical, and those of skill in the art are able to select the appropriate types and proportions of gums. Other gums besides those listed may be used as well, as would be known by those of skill in the art.

Typically in the baking of commercial baked goods, the above dry ingredients are packaged and sent to bakeries or stores. To make the baked goods from the above formulation of dry ingredients, yeast and water are added and mixed at the bakery or store. Yeast is added at a ratio of 4 percent of the weight of the dry ingredients, and water is added at a ratio of 43–46 percent of the weight of the dry ingredients. The dough is then allowed to rest, formed, proofed, and baked, as indicated above.

Figure 9:
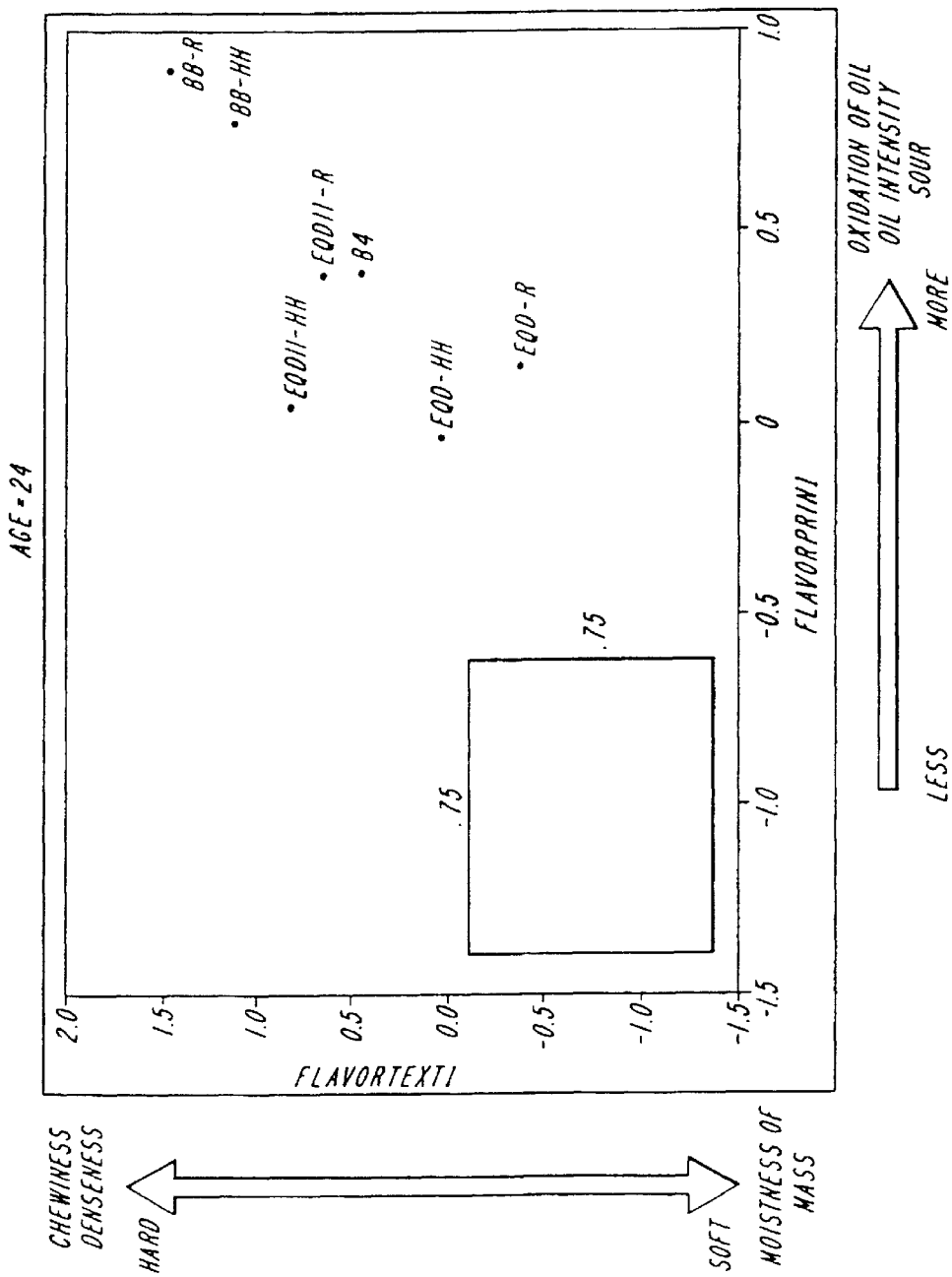
FIG. 9 is a graph of texture vs. flavor for doughnuts according to the present invention and prior art doughnuts.
Figure 10:
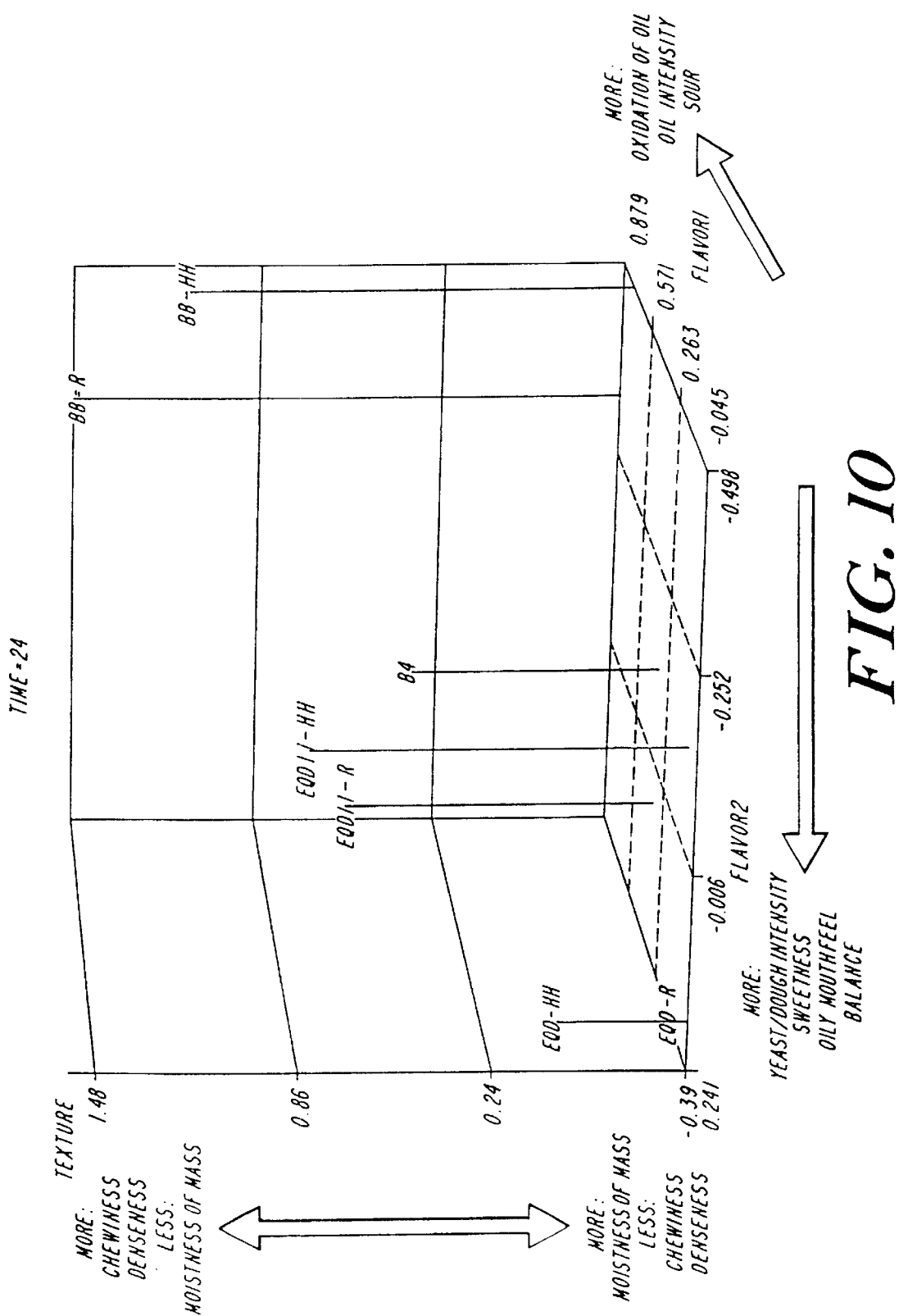
FIG. 10 is a further graph of texture vs. flavor for doughnuts according to the present invention and prior art doughnuts.
Figure 11:
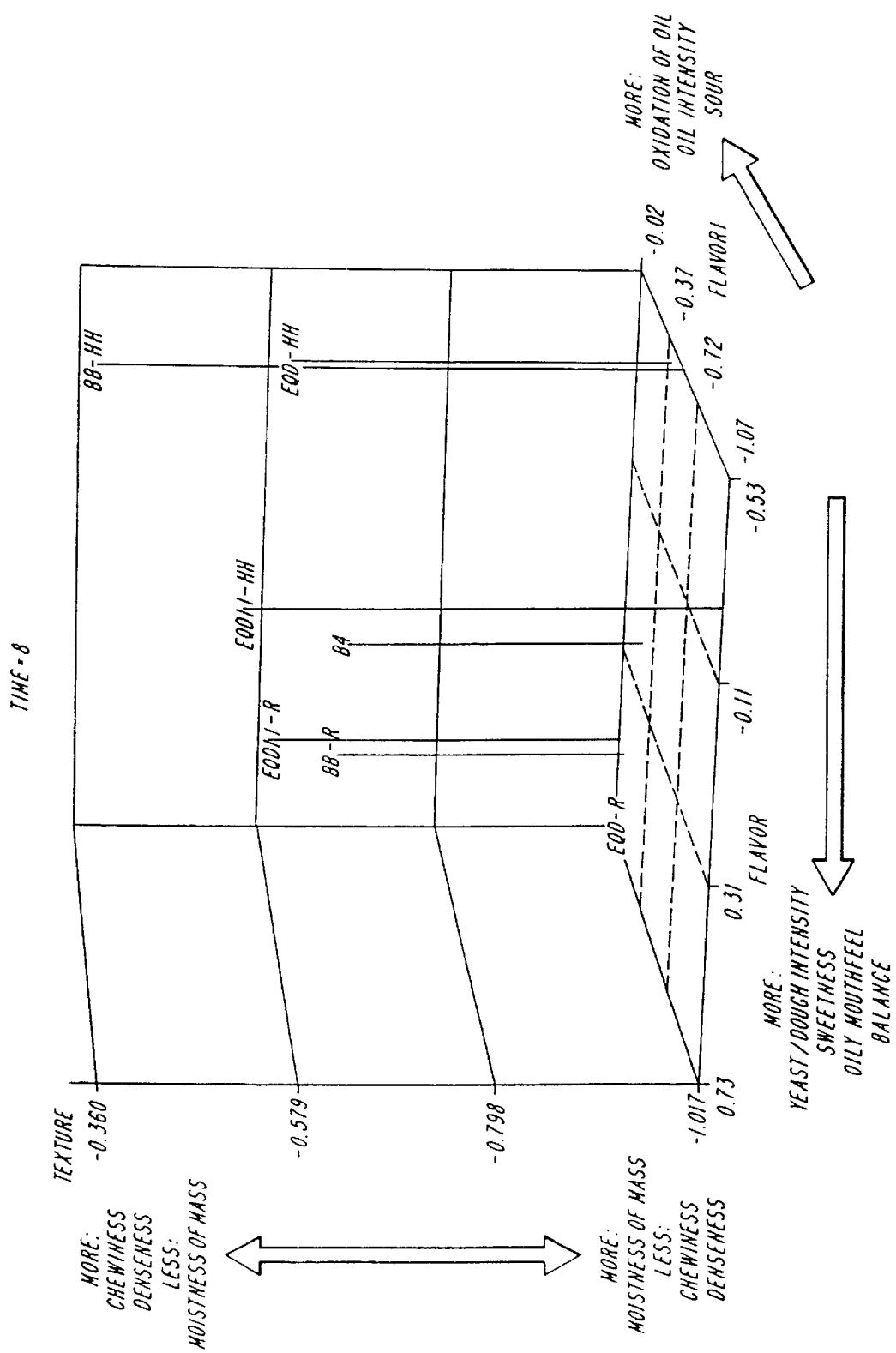
FIG. 11 is a still further graph of texture vs. flavor for doughnuts according to the present invention and prior art doughnuts.

The effectiveness of these ingredients in extending doughnut shelf life was evaluated by a professional sensory panel and by instrumental texture (compressibility) measurements. The doughnuts of the present invention were compared to standard doughnuts at eight and twenty-four hour intervals. A series of flavor maps was created by plotting the flavor and texture indices against each other, illustrated in FIGS. 9–11. The graphs illustrate that the extended shelf life doughnuts, designated by the letters "EQD" and "EQDII," show improved texture and flavor after eight and twenty-four hours compared to the prior art doughnuts, designated by the letters "BB". The designation "HH" refers to a high heat environment, and the designation "R" refers to a regular environment.

The invention is not to be limited by what has been a particularly shown and described, except as indicated by the appended claims.

We claim:

1. A proofer for making yeast-raised baked goods having an extended shelf life, the proofer comprising:
    an insulated housing having a sealable door therein;
    a proofing chamber within the housing sized to received a rack for holding a raw dough product;
    a controller;
    a dehumidifying device located within the housing on an airflow path and in communication with the controller;
    a heat source located within the housing on the airflow path and in communication with the controller;
    a humidifying device located within the housing on the airflow path and in communication with the controller;
    an air circulator located within the housing in a position to direct air on the airflow path into the proofing chamber, the air circulator in communication with the controller; and
    at least one sensor comprising a relative humidity sensor or a temperature sensor located within the proofing chamber, the at least one sensor in communication with the controller, the controller operative to control the dehumidifying device, the heat source, and the humidifying device to condition the air to proof the raw dough product.

2. The proofer of claim 1, wherein the sensor is located on an inside surface of the sealable door.

3. The proofer of claim 1, wherein the sensor is located at a midpoint on an inside surface of the sealable door.

4. The proofer of claim 1, wherein the sensor is located on an inside rear surface within the proofing chamber.

5. The proofer of claim 1, wherein the sensor is located at a midpoint on an inside rear surface within the proofing chamber.

6. The proofer of claim 1, wherein the sensor is mounted on an arm extending from an inside rear surface within the proofing chamber.

7. The proofer of claim 1, wherein the sensor is mounted in a protective housing.

8. The proofer of claim 1, wherein the sensor comprises a temperature sensor.

9. The proofer of claim 8, wherein the temperature sensor has an accuracy of ±1° F.

10. The proofer of claim 1, wherein the sensor comprises a relative humidity sensor.

11. The proofer of claim 10, wherein the relative humidity sensor has a 15 second response time for a 90% change in relative humidity.

12. The proofer of claim 10, wherein the relative humidity sensor has an accuracy of at least ±2%.

13. The proofer of claim 1, further comprising a second sensor comprising a relative humidity sensor or a temperature sensor.

14. The proofer of claim 13, wherein the at least one sensor is located on an inside surface of the sealable door and the second sensor is located on an inside rear surface within the proofing chamber.

15. The proofer of claim 13, wherein the at least one sensor comprises a relative humidity sensor and the second sensor comprises a temperature sensor.

16. The proofer of claim 15, wherein the relative humidity sensor and the temperature sensor are located on an inside surface of the sealable door.

17. The proofer of claim 13, further comprising a third sensor located on an inside rear surface within the proofing chamber.

18. A proofer for making yeast-raised baked goods having an extended shelf life, the proofer comprising:
  an insulated housing having a sealable door therein;
  a proofing chamber within the housing sized to received a rack for holding a raw dough product;
  a controller;
  at least one component located within the housing on an airflow path and in communication with the controller to provide an airflow conditioned for proofing the raw dough product, the at least one component comprising a dehumidifier, a heating unit, or a humidifier, the at least one component operative to return to a desired set point within no more than fifteen minutes after unsealing a preheated proofing chamber; and
  an air circulator located within the housing in a position to direct air on the airflow path into the proofing chamber, the air circulator in communication with the controller.

19. The proofer of claim 18, wherein the at least one component comprises a dehumidifier and the set point comprises a relative humidity.

20. The proofer of claim 18, wherein the at least one component comprises a humidifier and the set point comprises a relative humidity.

21. The proofer of claim 18, wherein the at least one component comprises a heating unit and the set point comprises a temperature.

22. The proofer of claim 18, wherein the controller includes a deadband adjustable to provide a desired tolerance on the set point while maximizing efficiency of the at least one component.

23. A proofer for making yeast-raised baked goods having an extended shelf life, the proofer comprising:
  an insulated housing having a rear wall, side walls, and a front sealable door therein;
  a proofing chamber within the housing sized to received a rack for holding a raw dough product;
  a controller;
  at least one component located within the housing on an airflow path and in communication with the controller to provide an airflow conditioned for proofing the raw dough product, the at least one component comprising a dehumidifier, a heating unit, or a humidifier;
  an air circulator located within the housing in a position to direct air on the airflow path into the proofing chamber, the air circulator in communication with the controller; and
  a rear partition disposed in the proofing chamber and spaced from the rear wall, and an airflow chamber defined between the rear partition and the rear wall, the rear partition comprising two side panels, each side panel including a plurality of openings disposed therein in at least two vertical columns.

24. The proofer of claim 23, wherein the openings are approximately 0.5 inch long and 0.25 inch high.

25. The proofer of claim 23, wherein each of the side panels includes a pair of inwardly facing vertical louvers.

26. The proofer of claim 25, wherein one of the louvers of the pair of louvers is directed at 90° to the plane of the rear partition and the other of the pair of louvers is directed at 45° to the plane of the rear partition.

27. The proofer of claim 25, further comprising a plurality of vertical slots disposed in the side panel adjacent the louvers.

28. The proofer of claim 27, wherein the slots are approximately 4.25 inches long.

29. The proofer of claim 27, wherein pairs of the slots are vertically spaced by approximately 1.5 inches.

30. The proofer of claim 27, wherein pairs of the opening are vertically aligned with respect to the pairs of the slots.

31. A proofer for making yeast-raised baked goods having an extended shelf life, the proofer comprising:
  an insulated housing having a sealable door therein;
  a proofing chamber within the housing sized to receive a rack for holding a raw dough product;
  a controller and at least one component in communication with the controller to provide an airflow conditioned for proofing the raw dough product; and
  a rack positioning device within the proofing chamber disposed to contact the rack and fix the rack in a desired position within the proofing chamber upon closure of the sealable door.

32. The proofer of claim 31, wherein the rack positioning device comprises a strip mounted along a rear surface of the proofing chamber in a position to limit travel of the rack toward the rear surface.

33. The proofer of claim 31, wherein the rack positioning device comprises a strip mounted along a side surface of the proofing chamber in a position to limit sideways travel of the rack toward the side surface.

34. The proofer of claim 31, wherein the rack positioning device comprises strips mounted along side surfaces of the proofing chamber in positions to limit sideways travel of the rack toward the side surfaces.

35. The proofer of claim 31, wherein the rack positioning device comprises a rear strip mounted along a rear surface of the proofing chamber in a position to limit travel of the rack toward the rear surface and side strips mounted along side surfaces of the proofing chamber in positions to limit sideways travel of the rack toward the side surfaces.

36. The proofer of claim 31, wherein the rack positioning device comprises angled strips mounted inside the proofing chamber to receive corners of the rack in snug engagement.

37. The proofer of claim 31, wherein the rack positioning device comprises a first strip mounted within the proofing chamber to limit rearward movement of the rack, and a further strip mounted on an inside surface of the sealable door in a location to press the rack against the first strip.

38. A proofer for making yeast-raised baked goods having an extended shelf life, the proofer comprising:
  an insulated housing having a rear wall, side walls, and a front sealable door therein;
  a proofing chamber within the housing sized to received a rack for holding a raw dough product;

a controller;

at least one component located within the housing on an airflow path and in communication with the controller to provide an airflow conditioned for proofing the raw dough product, the at least one component comprising a dehumidifier, a heating unit, or a humidifier;

an air circulator located within the housing in a position to direct air on the airflow path into the proofing chamber, the air circulator in communication with the controller; and a partition disposed in the proofing chamber and spaced from at least one wall of the rear wall and the side walls, and an airflow chamber defined between the partition and the at least one wall, the partition comprising a panel including a plurality of openings disposed therein in at least two separate regions.

39. The proofer of claim 38, wherein the partition is a rear partition and the region comprise side panels in the rear partition, the plurality of openings disposed in each side panel in at least two vertical columns.

40. The proofer of claim 38, wherein the partition is a side partition spaced from one of the side walls, and the regions comprise an upper region of perforations having a first pattern and a lower region of perforations having a second pattern different from the first pattern.

41. The proofer of claim 40, further comprising a second side partition spaced from the other of the side walls.

* * * * *